(12) United States Patent
Bonne

(10) Patent No.: US 8,342,602 B2
(45) Date of Patent: Jan. 1, 2013

(54) CAR SEAT

(75) Inventor: Daniel Bonne, de Cocksdorp (NL)

(73) Assignee: D. Bonne Mechanisatie B.V., De Cocksdorp (NL)

( * ) Notice: Subject to any disclaimer, the term of this patent is extended or adjusted under 35 U.S.C. 154(b) by 257 days.

(21) Appl. No.: 12/689,573

(22) Filed: Jan. 19, 2010

(65) Prior Publication Data

US 2010/0181811 A1    Jul. 22, 2010

Related U.S. Application Data

(60) Provisional application No. 61/145,609, filed on Jan. 19, 2009.

(30) Foreign Application Priority Data

Jan. 19, 2009    (NL) ..................................... 2002430

(51) Int. Cl.
   *B60N 2/42* (2006.01)
(52) U.S. Cl. .................................. 297/216.13
(58) Field of Classification Search ............... 297/216.1, 297/216.13, 216.14, 452.34, 452.36, 411.29
   See application file for complete search history.

(56) References Cited

U.S. PATENT DOCUMENTS

| | | | | |
|---|---|---|---|---|
| 254,115 | A * | 2/1882 | Comstock | 297/352 |
| 2,393,499 | A | 1/1946 | Flint | |
| 4,938,527 | A | 7/1990 | Schmale et al. | |
| 6,491,346 | B1 * | 12/2002 | Gupta et al. | 297/452.65 |
| 7,096,562 | B1 * | 8/2006 | Dehart | 29/527.1 |
| 7,128,373 | B2 * | 10/2006 | Kurtycz et al. | 297/452.15 |
| 7,959,233 | B2 * | 6/2011 | Sweers et al. | 297/452.18 |
| 2005/0099032 | A1 | 5/2005 | Dehart | |
| 2006/0138830 | A1 | 6/2006 | Liu | |
| 2006/0152065 | A1 | 7/2006 | Black | |

FOREIGN PATENT DOCUMENTS

| | | | |
|---|---|---|---|
| DE | 3239292 A1 | * | 5/1983 |
| DE | 89 06 062 U1 | | 7/1989 |
| DE | 38 08 316 A1 | | 9/1989 |
| FR | 799 229 A | | 6/1936 |
| FR | 2 214 609 A | | 8/1974 |
| GB | 1 438 905 | | 6/1976 |
| JP | 2006198128 A | * | 8/2006 |

OTHER PUBLICATIONS

Search Report for NL/2002430.

* cited by examiner

*Primary Examiner* — Milton Nelson, Jr.
(74) *Attorney, Agent, or Firm* — Hoffmann & Baron, LLP

(57) ABSTRACT

The present invention relates to a car seat. The car seat is a bucket seat having a bottom support section for supporting the bottom of a user, a back support section for supporting the back of the user, a shoulder support section for supporting the shoulders of the user, a head support section for supporting the head of the user, and a left flank support section and a right flank support section for protecting the left and right flank of the user. A substantial part of the bucket seat is constructed from aluminium sheet. The car seat further includes at least one composite reinforcement member which extends along a part of the bucket seat and is mounted to the bucket seat. The at least one composite reinforcement member is manufactured from a composite material. The present invention further relates to a method for manufacturing the car seat.

12 Claims, 5 Drawing Sheets

CAR SEAT

CROSS-REFERENCE TO RELATED APPLICATIONS

This application claims the benefit of U.S. Provisional Application No. 61/145,609, filed Jan. 19, 2009, and further claims of benefit of Netherlands Application No. 2002430, filed Jan. 19, 2009, the contents of all of which are incorporated by reference herein.

FIELD OF THE INVENTION

The present invention relates to a car seat and a method of manufacturing a car seat. Car seats are known in the prior art.

BACKGROUND OF THE INVENTION

In the field of racing, special car seats have been developed which provide good support for the user. The car seats are strong and preferably light-weight.

These seats are sometimes referred to as "full-containment seats", because they more or less fully contain the body of a user. These seats are used as race car seats.

At the time of a crash, substantial forces are exerted on the car seat. Also during driving, substantial forces are exerted by the seat on the user and vice versa.

Full containment car seats are often made from aluminium sheet. The sheet is cut in a predetermined way. In the same operation, holes are cut at certain places in the sheet. The cutting process is often performed with computer controlled cutting means.

Subsequently, the cut sheets are formed into a three-dimensional shape, i.e. the shape of the seat. The shaping process is often carried out with a computer-controlled forming machine.

Although the presently known seats are substantially strong and rigid, and provide a substantial protection against impact from the side or from another direction, there is a constant need in the field of the art to improve the seats. A better protection from the seat may lead to fewer casualties or less severe injuries in case of a crash.

This need is increased by new regulations from authorities which require better protection for race drivers.

It was found in practice that an aluminium bucket seat which is further reinforced becomes very heavy, which leads to a disadvantage in racing properties. Race cars need to be light-weight, and thus a heavy seat leads to a slower car.

In order to overcome this disadvantage, bucket seats have been developed which are manufactured from carbon. These race seats have the advantage of a light weight. However, these bucket seats are very expensive, in particular because an individual, separate mould has to be manufactured for each size of bucket seat that is to be made. In contrast, an aluminium bucket seat does not require a mould and therefore can be manufactured in any size with limited or no extra costs per size.

Further, the actual manufacturing of a carbon seat often requires extensive manual labour, which increases the costs.

Further, carbon is very sensitive to abrasive wear from the user who sits in the seat. Thus, carbon seats tend to wear relatively quickly and may have a relatively low life expectancy in some circumstances.

SUMMARY OF THE INVENTION

It is an object of the invention to provide an alternative car seat.

It is an object of the invention to provide a car seat that provides a better protection for the user and is light-weight.

It is an object of the invention to provide a car seat strong that provides a better protection for the user and which can be manufactured relatively simple.

It is an object of the invention to provide a car seat that provides a better protection for the user and which has a relatively long life expectancy.

At least one object is achieved in a car seat comprising a bucket seat which comprises:
 a bottom support section for supporting the bottom of a user,
 a back support section for supporting the back of the user,
 a shoulder support section for supporting the shoulders of the user,
 a head support section for supporting the head of the user,
 a left flank support section and a right flank support section for protecting the left and right flank of the user, a substantial part of the bucket seat being constructed from aluminium sheet,
wherein the car seat further comprises at least one composite reinforcement member which extends along a part of the bucket seat and is mounted to the bucket seat, wherein the at least one composite reinforcement member is manufactured from a composite material.

With the invention, a relatively light-weight seat which provides a good protection for the user can be manufactured in a simple way. The composite reinforcement members provide additional strength and/or stiffness to the bucket seat and improve the protection for the user.

In a suitable embodiment, different sizes of the seat can be manufactured with little or no extra costs, in particular different widths and/or differing lengths of the bucket seat.

The bucket seat (or bucket seat part) follows the outer contours of the body of the user. The bucket seat defines a form which closely accommodates and supports the user. The bottom support section, back support section, shoulder support section, head support section and left and right flank support sections together form the bucket seat. The legs, thighs, buttocks, trunk, shoulders, neck, head, arms and other body parts determine the shape of the body and thus the shape of the bucket seat.

Typically, the user is a driver. However, a co driver, navigator, instructor, passenger may also be seated in the car seat. The car seat is typically suitable for use as a race car seat.

The reinforcement members can be manufactured from a thermosetting material such as epoxy in combination with carbon fibre, aramid fibre and/or glass fibre.

Carbon fibre composites have superior fatigue properties in comparison with metal such as aluminium and are very suitable for this purpose.

The bottom support section, back support section, shoulder support section, head support section and left and right flank support sections may be substantially or fully integral with one another.

The flank support sections of the bucket seat are configured to extend around the flanks of the user, in order to protect the user from side impacts.

The flank support sections extend substantially upwards from the bottom support section and substantially forwards from the back support section, shoulder support section and the head support section.

The flank support sections may be upstanding ridges.

In a suitable embodiment, at least one composite reinforcement member has a substantial L-shape form, wherein one section of the L-form extends along a posterior surface of the bucket seat and another section of the L-form extends along a left or right flank support section of the bucket seat.

The posterior surface is defined as the surface which faces away from the user. The anterior side is defined as a surface which is directed toward the user and contacts the user in use.

The L-shaped reinforcement members can be made from composite in a separated manufacturing process. The L-shape has two branches and a curve between the two branches. One branch extends along the posterior surface and one branch extends along the flank support section.

In a suitable embodiment, the at least one composite reinforcement member is a bar having a substantial uniform cross-section.

In an embodiment, the car seat comprises at least two composite reinforcement members each having a substantial L-shaped form, the two substantial L-forms being positioned relative to one another in such a way that a substantial C-shape is formed of which a central part extends substantially laterally along a posterior side of the bucket seat from a left side to a right side of the bucket seat and of which the two end parts extend along the left and right flank support sections.

Two L-shaped composite reinforcement members may be aligned in order to form a substantial C-shape. The C-shape may form a bracket which extends around the bucket seat. This is a simple way of providing additional strength to the bucket seat. The two composite reinforcement members may or may not be connected to one another.

However, in an alternative embodiment, integral, substantially C-shaped reinforcement members may be provided. This embodiment provides an advantage of ready-to-use reinforcement members which do not need to be assembled from two L-shapes.

In a suitable embodiment, the car seat comprises at least one longitudinal composite reinforcement member which extends longitudinally along a posterior surface of the bucket seat and is mounted to the posterior surface of the bucket seat.

The longitudinal reinforcement member increases the bending stiffness of the seat in its longitudinal direction.

In one embodiment, the car seat comprises at least two longitudinal composite reinforcement members, the at least two longitudinal composite reinforcement members being spaced apart and extending substantially parallel to one another, wherein at least one longitudinal reinforcement extends along a left half of the bucket seat and wherein at least one longitudinal reinforcement extends along a right half of the bucket seat.

In this way, a solid structural reinforcement of the bucket seat is attained.

In one embodiment, the car seat comprises at least one laterally extending composite reinforcement member which is connected to the longitudinal composite reinforcement members and connects the at least two longitudinal composite reinforcement members with one another.

In an embodiment, the lateral reinforcement member and the longitudinal reinforcement members create a strong frame-like structure via the at least one connection.

In one embodiment, the car seat comprises:
- at least one composite reinforcement member which extends laterally along the head support section of the bucket seat and which comprises a projection which extends along a flank support section at the level of the head support section and/or
- at least one composite reinforcement member which extends laterally along the shoulder support section of the bucket seat at the envisaged level of the shoulders of the user and which comprises a projection which extends along a flank support section at the level of the shoulders of the user, and/or
- at least one composite reinforcement member which extends laterally along the back support section of the bucket seat at the envisaged level of the ribs of the user and which comprises a projection which extends along a flank support section at the level of the ribs of the user, and/or
- at least one composite reinforcement member which extends laterally along the back support section of the bucket seat at the envisaged level of the hips of the user and which comprises a projection which extends along a flank support section at the level of the hips of the user.

These four lateral reinforcement members allow reinforcement where it is needed and create extra stiffness where it is needed.

Optionally, two head support reinforcement members may be provided, one at the level of a lower part of a head of a user and one at the level of an upper part of a head of a user.

In one embodiment, the car seat comprises at least one lateral composite reinforcement member and at least one longitudinal composite reinforcement member which cross one another at least one location, wherein at the crossing location the longitudinal composite reinforcement member is provided between the lateral composite reinforcement member and the bucket seat part.

This embodiment has the feature that there is a gap between the laterally extending reinforcement member and the posterior surface of the seat. The longitudinal reinforcement member is positioned in the gap.

In a suitable embodiment, the lateral composite reinforcement member is connected to the bucket seat at the crossing location, wherein a connection device extends through the longitudinal composite reinforcement member from the lateral composite reinforcement member to the bucket seat.

In this way, both the longitudinal composite reinforcement member and the lateral reinforcement member may be connected to the bucket seat at a point via a single, simple connection.

In one embodiment, the composite reinforcement members are mounted to the bucket seat at a plurality of connection locations. This allows the bucket seat and the reinforcement members to cooperate as an integrated framework.

Typically, the composite reinforcement members are bars or bar-like members.

When viewed in cross-section, the reinforcement members have a width, a height a wall thickness. The width, height and wall thickness may or may not vary over the length of the reinforcement elements. The reinforcement members may be profiles having a C-shape, U-shape, I-shape, H-shape or O-shaped, when viewed in cross-section. Other shapes are also possible.

The connections between the bucket seat and the reinforcement members may be bolts, screws, or similar devices known in the field of the art. Is may also be possible to glue the reinforcement members to the bucket seat.

The flank parts of the lateral reinforcement members form protuberances which extend forward an/or upward from a laterally extending section of the lateral reinforcement members At the level of the head, two lateral reinforcement members may be provided, one at the neck level and one at an upper part of a head of the user.

The reinforcement members may be pre-manufactured according to standard sizes, and simply cut to the required length on installation. This allows a same standard size to be used for different bucket seat sizes.

The longitudinal reinforcement members extend substantially in a vertical plane.

In side view, the longitudinal reinforcement member follows the contour of the user.

The longitudinal member may be a bar having a C-shape, I-shape, H-shape or O-shape The bucket seat has an inner surface (or anterior surface) configured to contact the user.

The user has substantially upright sitting position or a sitting position which is inclined to the rear over a certain angle.

The composite reinforcement members may be manufactured form carbon fibre with resin, as is known in the field of the art.

The composite reinforcement members may be manufactured as L-shaped members having only one size or possibly two sizes. Depending on the width of the seat, one branch of the L-form or both branches of the L-form is/are cut to the required length. Subsequently, the composite reinforcement members are mounted to the bucket seat.

The back support section supports the back of the user. Together with the flank support sections which are connected to the back support section, the trunk of the user is supported.

The composite reinforcement members extend along the posterior (or rear side) of the back support section, the shoulder support section and head support section and along the underside of the bottom support section. The reinforcement members are provided on an outer side of the bucket seat.

The bucket seat has ridges which may have been reinforced with an aluminium profile.

The bucket seat may be divided in a left half and a right half by a vertical plane which extends centrally through the seat. At least one composite reinforcement member may extend from said vertical plane to a left or right side of the car seat.

The composite reinforcement members may be mounted to the posterior surface of the bucket seat at different locations. However, it is also possible that the lateral composite reinforcement members are only connected to the bucket seat in one location and are pressed against the bucket seat with a substantial force by the single connection.

The car seat may comprise at least one longitudinal composite reinforcement member which extends longitudinally along at least a part of the bottom support section, back support section, shoulder support section and is connected to the bottom support section, back support section and shoulder support section. In a suitable embodiment, at least one longitudinal composite reinforcement member extends substantially all the way from the bottom support section to the head support section.

In side view, the longitudinal composite reinforcement members may substantially follow the direction of a spine of the user.

The present invention further relates to a method of manufacturing a car seat, the method comprising:
 providing at least one aluminium sheet,
 cutting the at least one aluminium sheet and shaping the aluminium sheet into a bucket seat comprising:
  a bottom support section for supporting the bottom of the user,
  a back support section for supporting the back of the user,
  a shoulder support section for supporting the shoulders of a user
  a head support section for supporting the head of the user,
  a left support section and a right side support section for protecting the left and right flank of the user,
 mounting at least one composite reinforcement member to the bucket seat, the composite reinforcement member extending along a part of the bucket seat, wherein the at least one composite reinforcement member is manufactured from a composite material.

The method according to the invention results in a car seat having the same advantages as discussed in relation to the car seat above.

In a suitable embodiment, the method comprises providing at least one composite reinforcement member having a substantial L-shape form, wherein one part of the L-shape form is connected to a posterior surface of the bucket seat and wherein another part of the L-shape form extends substantially parallel to the left flank section or the right flank section of the bucket seat.

With the L-shaped forms, it is possible to use a single size of L-form or a relatively few number of sizes of L-forms to reinforce bucket seats having many different sizes and shapes.

Thus, in a suitable embodiment, the method comprises providing a standard size composite reinforcement member having a substantially L-shape form for car seats of different sizes and cutting a part from at least one branch of the L-shape in order to adapt the size of the L-shape to differing sizes of the car seats.

The at least one composite reinforcement member is connected to the posterior surface of the bucket seat via a connection device, such as a bolt or screw.

It is not required that the entire bucket seat is manufactured from aluminium.

In one embodiment, the head support section is manufactured substantially from a composite material instead of substantially from aluminium.

It is also possible that the shoulder support section is manufactured from composite.

The present invention further relates to a composite reinforcement member constructed and arranged to reinforce a car seat. In an embodiment, the composite reinforcement member has a substantial L-shape form. In another embodiment, the composite reinforcement member may comprise connection openings which allow a connection device to be inserted and fasten the reinforcement member to the bucket seat. Other types of connections are also possible.

BRIEF DESCRIPTION OF THE DRAWINGS

The objects and features of the present invention will become more apparent, and the invention itself will be best understood from the following detailed description of the present invention when read with reference to the accompanying drawings.

DETAILED DESCRIPTION OF PREFERRED EMBODIMENTS

Figure 1:
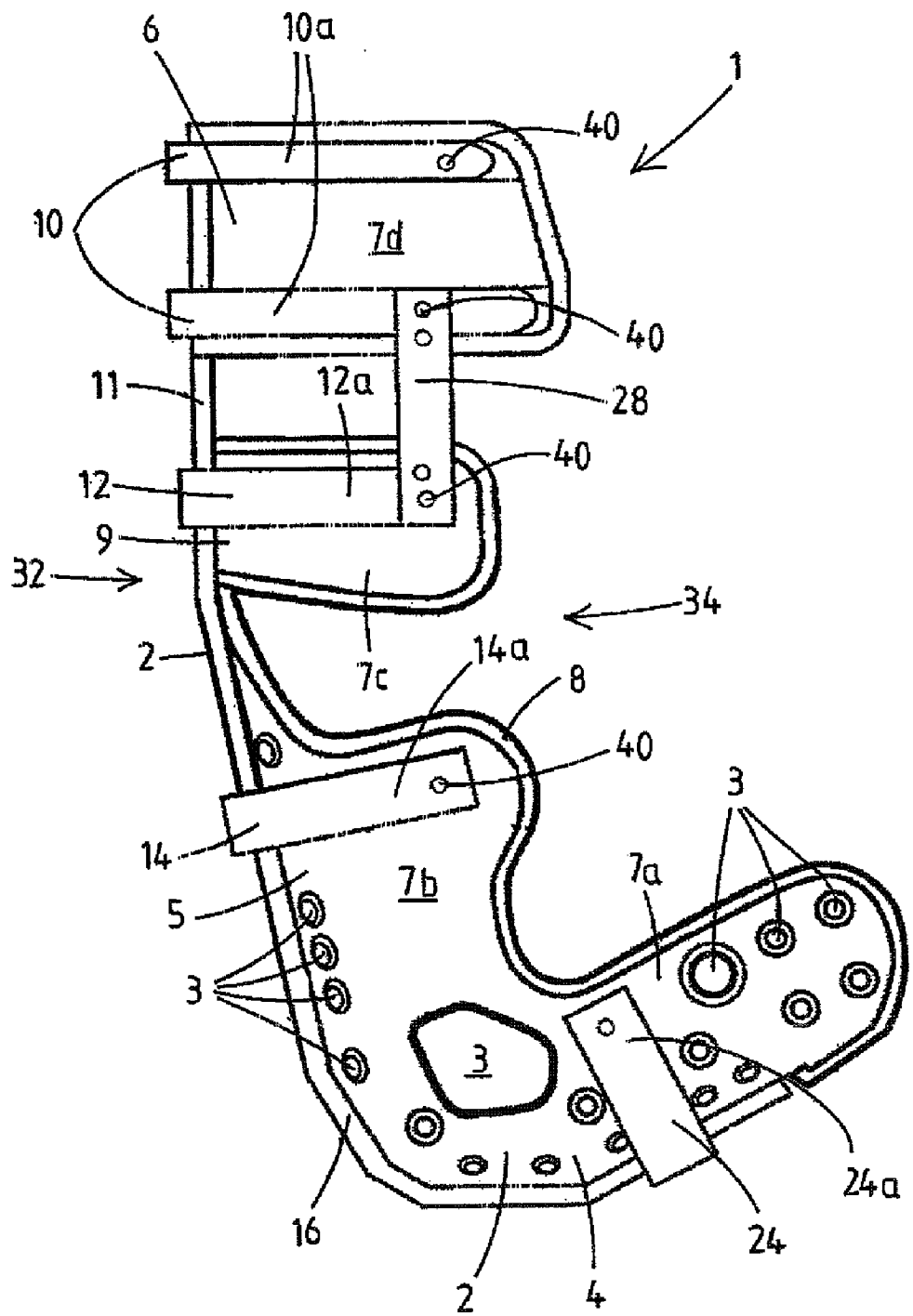
FIG. 1 shows a diagrammatical side view of the car seat according to the invention.
Figure 2:
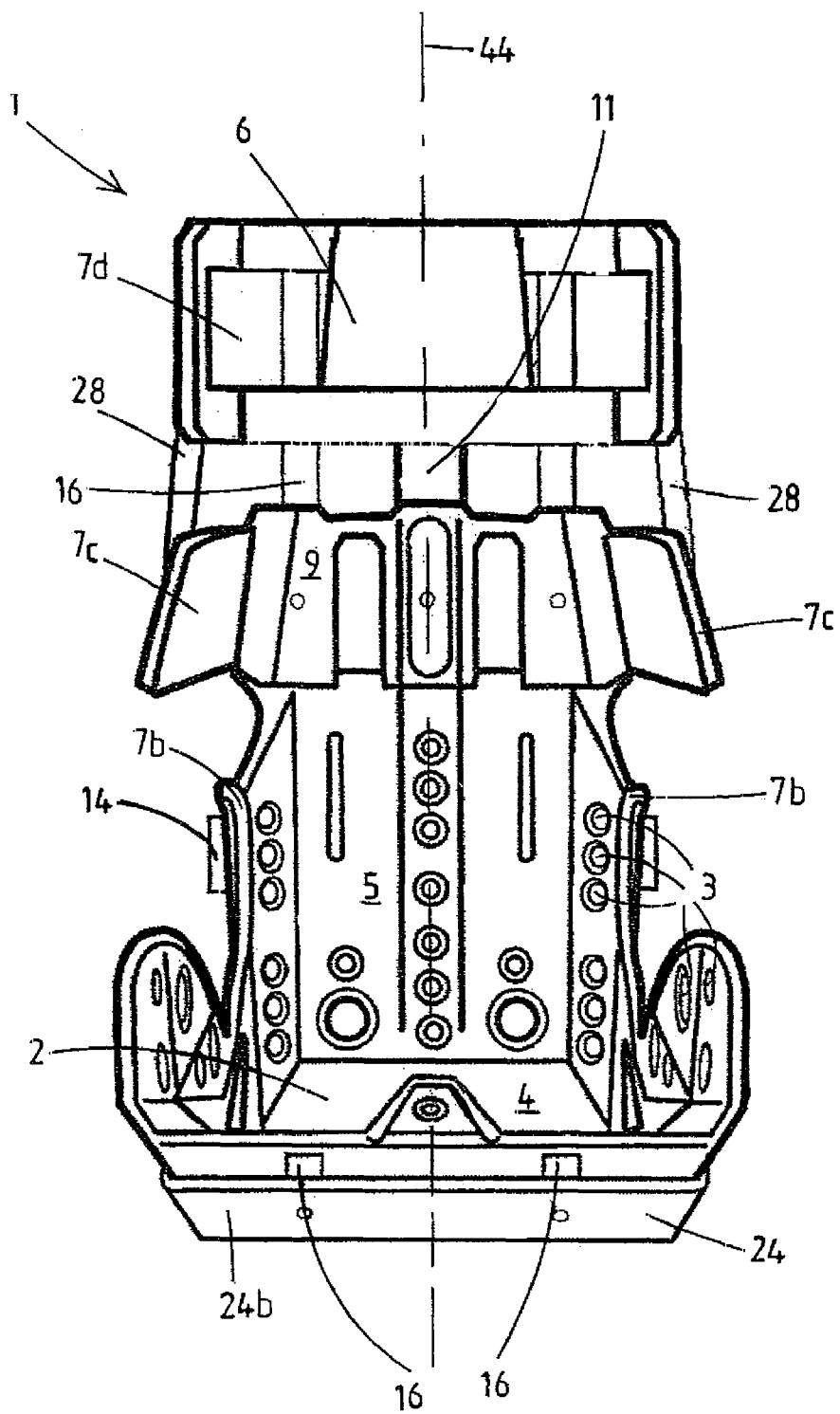
FIG. 2 shows a diagrammatical front view of the car seat according to the invention.
Figure 3:
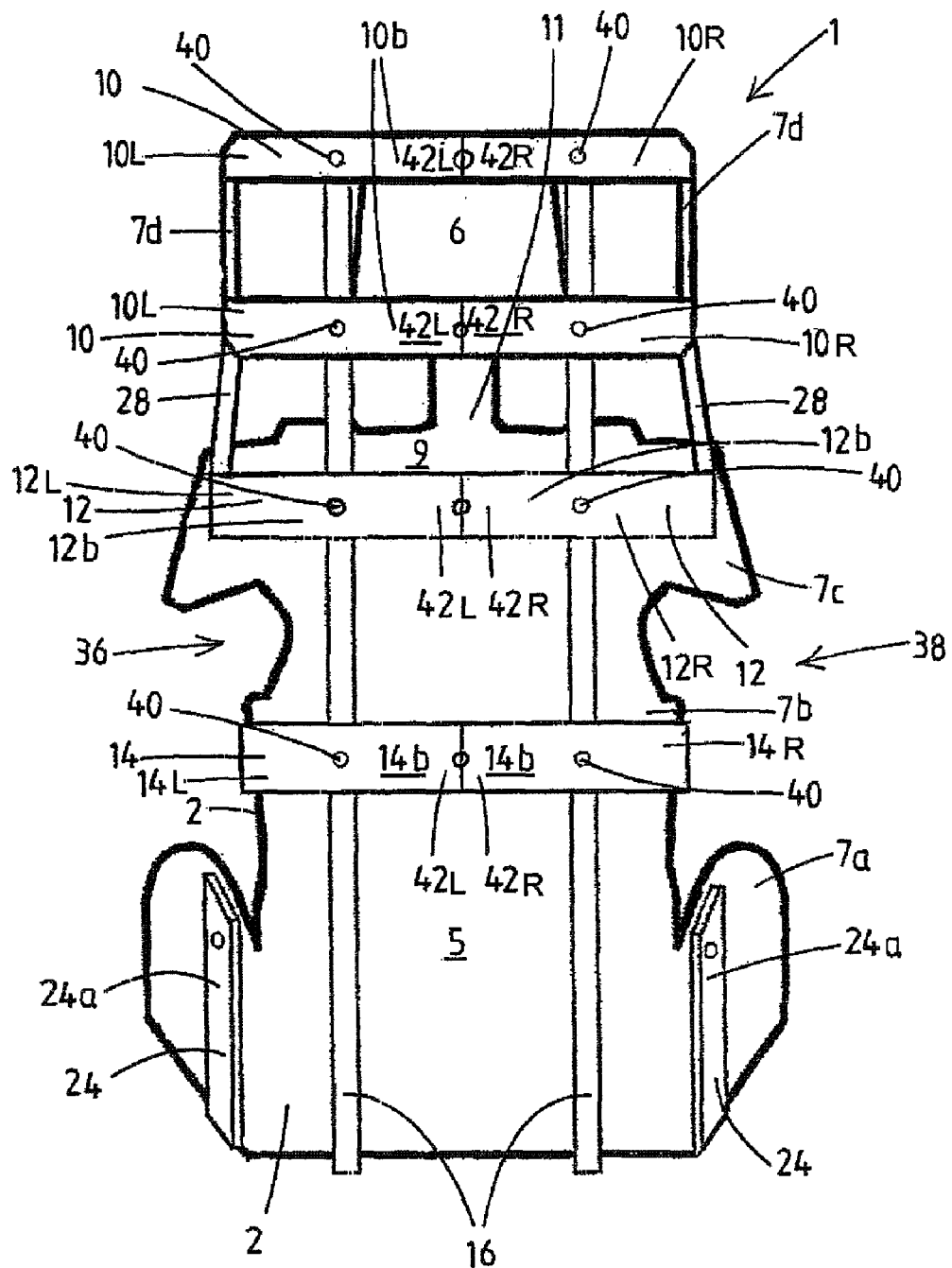
FIG. 3 shows a diagrammatical front view of the car seat according to the invention.

Turning to FIGS. 1, 2 and 3, a car seat 1 according to the invention is shown. The car seat comprises a bucket seat 2.

The bucket seat 2 fully contains the body of a user and is generally referred to in the field of the art as a full-containment seat.

The bucket seat 2 comprises a bottom support section 4, a back support section 5, a shoulder support section 9 and a head support section 6. The head support section 6 is connected to the rest of the bucket seat 2 via a column 11, but may also be integral with the rest of the bucket seat 2.

The bucket seat 2 further comprises different flank support sections 7a, 7b, 7c and 7d. The flank support sections 7a, 7b, 7c, 7d are substantially integral with the other parts of the bucket seat 2 and form a strong structure around the body of a user. Apart from strengthening the bucket seat 2, the flank support sections protect specific parts of the body of a user against side impact.

The flank support section 7a protects the upper legs of the user from side impacts.

The flank support section 7b protects the hips, lower back and upper back from side impacts.

The flank support section 7c protects the shoulders of the user from side impacts.

The flank support section 7d protects the head of the user from side impacts.

The bucket seat defines a posterior surface 32 which faces away from a user and an anterior surface 34 which is configured to contact a user.

The bucket seat 2 is made substantially from aluminium sheet. Like the bottom support section 4, back support section 5, shoulder support section 9 and head support section 6, the flank support sections 7a, 7b, 7c, 7d are manufactured from aluminium sheet.

In an alternative embodiment, the head support section 6 and/or shoulder support section 9 is made from a composite material.

A ridge 8 extends round the perimeter of the bucket seat 2. The ridge 8 is a thicker part of aluminium. Various ribs and other reinforcements are provided in aluminium sheet, mostly by form alone.

The bucket seat 2 is an integral construction and very suitable for racing purposes.

The bucket seat 2 comprises various openings 3.

The bucket seat comprises a plurality of composite reinforcement members 10, 12, 14, 24 which extend in part laterally along the posterior side of the bucket seat 2 and which comprise respective projections 10a, 12a, 14a, 24a which extend around the flanks of the bucket seat 2.

In one embodiment, the composite reinforcement members 10, 12, 14, 24 are C-shaped members having a projection 10a, 12a, 14a, 24a on both sides of the bucket seat.

However, in the shown embodiment, the composite reinforcement members 10, 12, 14, 24 are divided in a left part 10L, 12L, 14L, 24L and a right part 10R, 12R, 14R, 24R and thus are L-shaped members.

The left part 10L, 12L, 14L, 24L and the right part 10R, 12R, 14R, 24R have ends 42L and 44R which meet at a center plane of the car seat 1 which center plane is indicated by dash-dotted line 44.

This construction allows the reinforcement members to be made from a standard size L-form, as will be discussed below.

Thus, a left reinforcement member 10L is substantially L-shaped and comprises part 10a and 10b. A right reinforcement member 10R is substantially L-shaped and also comprises part 10a and part 10b.

Two longitudinal composite reinforcement members 16 are provided which extend lengthwise along the posterior side 32 of the bucket seat 2 from the bottom support section 4 to the head support section 6. The longitudinal reinforcement members 16 have a curved form and substantially follow the backside of the bucket seat 2 and the spine of a user.

Optionally, further reinforcement composite members 28 may be provided for providing a structural connection between the flank supports 7c and 7d.

The car seat has connection points at which the care seat can be firmly connected to a car in which it is to be placed.

Turning in particular to FIG. 2, a lateral part 24b of the hip reinforcement member 24 is shown. The lateral part 24b extends along the underside of the bottom support section 4. The hip reinforcement member is shown as a C-shaped member, but can also be provided as two combined substantially L-shaped members.

The ends of the longitudinal reinforcement members 16 can be seen at the underside of the bottom support section 4

Turning in particular to FIG. 3, it can be seen that one longitudinal reinforcement member extends along a left half 36 of the bucket seat 2 and a second longitudinal reinforcement member 16 extends along a right half 38 of the bucket seat 2.

Connections 40 are shown via which the different reinforcement members 10, 12, 14, 16 and 24 are connected to the bucket seat 2.

Figure 4:
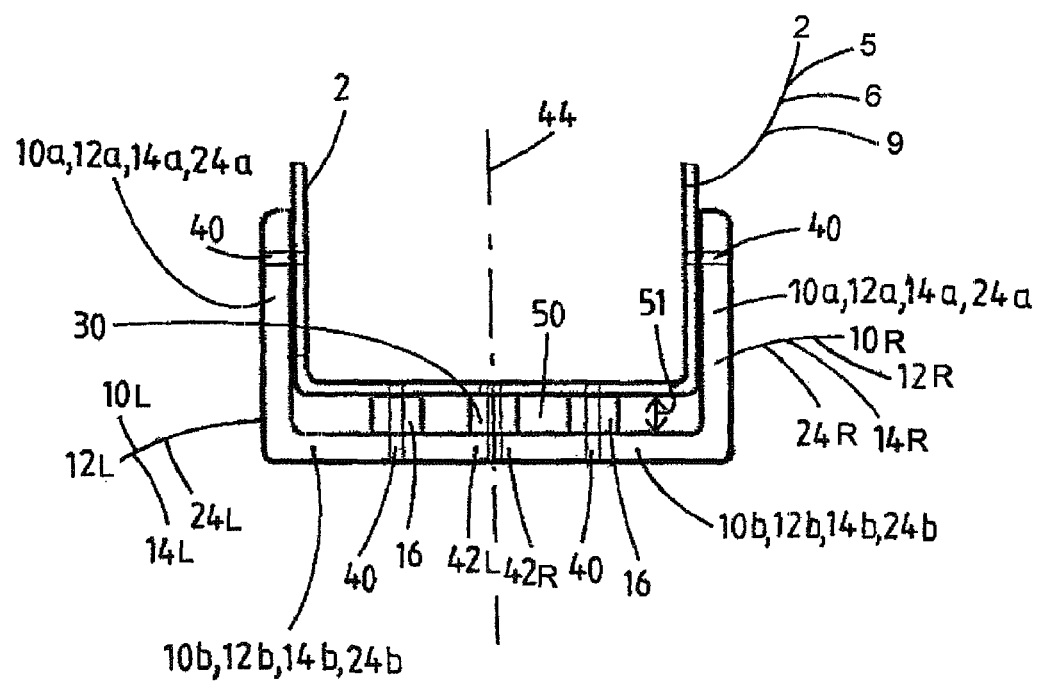
FIG. 4 shows a detail view of reinforcement members connected to the car seat.

Turning to FIG. 4, a top view of a composite reinforcement member 10, 12, 14, 24 is shown and its connections 40 to the bucket seat 2. The lateral parts 10b, 12b, 14b, 24b extend at a distance 51 from the posterior side of the bucket seat 2. Thus, a gap 50 is provided between the lateral parts 10b, 12b, 14b, 24b and the posterior surface of the bucket seat 2. The longitudinal reinforcement members 16 extend in the gap 50.

A spacer member 30 is provided centrally in order to support the ends 42L, 42R of the different reinforcement members.

Figure 5:
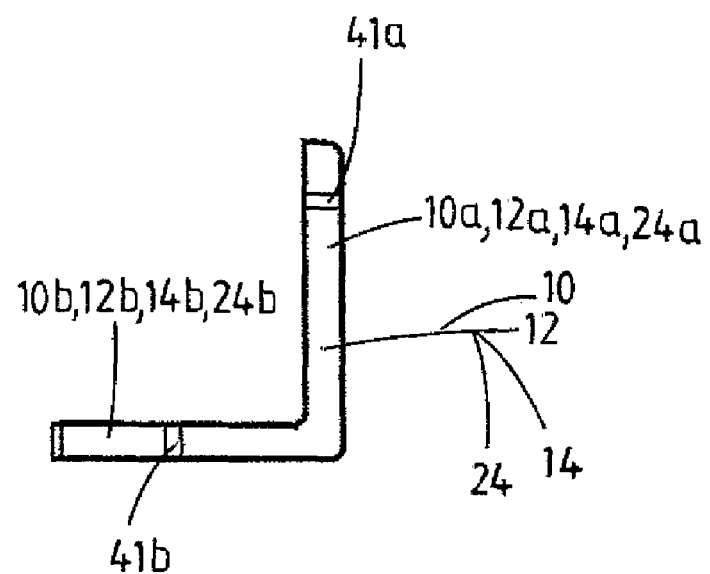
FIG. 5 shows a detail view of a reinforcement member.

Turning to FIG. 5, a view of an L-shaped composite reinforcement member 10, 12, 14, 24 is shown. The composite reinforcement member can be pre-manufactured in one standard size or a few standard sizes.

Holes are provided in the L-form at suitable locations for connection with the bucket seat. In particular, a hole 41a may be provided for connection with the flank of the bucket seat 2 and a hole 41b may be provided for a connection with a bottom support section 4, back support section 5, shoulder support section 9, or head support section 6 of the bucket seat 2.

Although the present invention has been shown and described with reference to preferred embodiments, such are merely illustrative of the present invention and are not to be construed as to be limited to the disclosed embodiments and/or details thereof, and the present invention includes all further modifications, variations and/or ultimate embodiments within the spirit and scope of the present invention as defined by the appended claims.

What is claimed is:

1. Car seat comprising a bucket seat which comprises:
   a bottom support section for supporting a bottom of a user,
   a back support section for supporting a back of the user,
   a shoulder support section for supporting shoulders of the user,
   a head support section for supporting a head of the user, and
   a left flank support section and a right flank support section for protecting a left and right flank of the user, a substantial part of the bucket seat being constructed from aluminium sheet,
   at least one composite reinforcement member extending along a part of the bucket seat and being mounted to the bucket seat, the at least one composite reinforcement member being manufactured from a composite material, wherein at least one composite reinforcement member extends laterally along the head support section of the bucket seat and comprises a projection which extends along a flank support section at the level of the head support section and/or at least one composite reinforcement member extends laterally along the back support section of the bucket seat at a level of a flank support section constructed to protect the shoulders of the user and comprises a projection which extends along the flank support section constructed to protect the shoulders of the user, and/or at least one composite reinforcement member extends laterally along the back support section of the bucket seat at a level of a flank support section constructed to protect an upper leg of the user and comprises a projection which extends along the flank support section constructed to protect the upper leg of the user, and/or at least one composite reinforcement member extends laterally along the back support section of the bucket seat at a level of a flank support section constructed to protect ribs of the user and comprises a projection which extends along the flank support section constructed to protect the ribs of the user.

2. Car seat of claim 1, wherein the at least one composite reinforcement member has a substantial L-shape form, wherein one section of the L-form extends along a posterior surface of the bucket seat and another section of the L-form extends along a left or right flank support section of the bucket seat.

3. Car seat of claim 2, comprising at least two composite reinforcement members each having a substantial L-shaped form, the two substantial L-forms being positioned relative to one another in such a way that a substantial C-shape is formed of which a central part extends substantially laterally along a posterior side of the bucket seat from a left side to a right side of the bucket seat and of which the two end parts extend along the left and right flank support sections.

4. Car seat according to claim 1, wherein the at least one composite reinforcement member is a bar having a substantially uniform cross-section.

5. Car seat according to claim 1, comprising at least one longitudinal composite reinforcement member which extends longitudinally along a posterior surface of the bucket seat and is mounted to the posterior surface of the bucket seat.

6. Car seat according to claim 5, comprising at least two longitudinal composite reinforcement members, the at least two longitudinal composite reinforcement members being spaced apart and extending substantially parallel to one another, wherein at least one longitudinal reinforcement extends along a left half of the bucket seat and wherein at least one longitudinal reinforcement extends along a right half of the bucket seat.

7. Car seat according to claim 6, wherein at least one of the laterally extending composite reinforcement members is connected to the longitudinal composite reinforcement members and connects the at least two longitudinal composite reinforcement members with one another.

8. Car seat according to claim 1, wherein the head support section is manufactured substantially from a composite material instead of substantially from aluminum.

9. Car seat according to claim 1, wherein at least one of the laterally extending composite reinforcement members and at least one longitudinally extending reinforcement member cross one another at at least one location, wherein at the crossing location the longitudinal composite reinforcement member is provided between the lateral composite reinforcement member and the bucket seat part.

10. Car seat according to claim 9, wherein the lateral composite reinforcement member is connected to the bucket seat at the crossing location, wherein a connection device extends through the longitudinal composite reinforcement member from the lateral composite reinforcement member to the bucket seat.

11. Car seat according to claim 1, wherein the composite reinforcement members are mounted to the bucket seat at a plurality of connection locations.

12. Car seat according to claim 1, wherein the composite reinforcement members are bars.

* * * * *